(12) United States Patent
Oishi

(10) Patent No.: US 10,112,681 B2
(45) Date of Patent: Oct. 30, 2018

(54) BICYCLE SPROCKET SUPPORTING MEMBER AND BICYCLE SPROCKET ASSEMBLY

(71) Applicant: Shimano Inc., Sakai, Osaka (JP)

(72) Inventor: Toshinari Oishi, Osaka (JP)

(73) Assignee: Shimano Inc., Osaka (JP)

( * ) Notice: Subject to any disclaimer, the term of this patent is extended or adjusted under 35 U.S.C. 154(b) by 125 days.

(21) Appl. No.: 15/216,096

(22) Filed: Jul. 21, 2016

(65) Prior Publication Data

US 2018/0022415 A1  Jan. 25, 2018

(51) Int. Cl.
| | |
|---|---|
| F16H 55/12 | (2006.01) |
| F16H 55/30 | (2006.01) |
| B62M 9/10 | (2006.01) |
| F16D 1/10 | (2006.01) |

(52) U.S. Cl.
CPC ............. B62M 9/10 (2013.01); F16D 1/10 (2013.01); F16H 55/30 (2013.01); *F16D 2001/103* (2013.01)

(58) Field of Classification Search
CPC .......... B62M 9/10; B62M 9/12; B62M 9/105; F16H 55/30; B60B 27/026
USPC .......................................................... 474/160
See application file for complete search history.

(56) References Cited

U.S. PATENT DOCUMENTS

| | | | | |
|---|---|---|---|---|
| 2,451,690 A * | 10/1948 | Oehler | ................. | B62D 55/135 474/160 |
| 4,089,231 A * | 5/1978 | Segawa | .................... | B62M 9/10 192/64 |
| 4,869,710 A * | 9/1989 | Iwasaki | .................... | B62M 9/10 474/160 |
| 6,382,381 B1 * | 5/2002 | Okajima | ............... | B60B 1/0215 192/64 |
| 6,428,437 B1 * | 8/2002 | Schlanger | ................ | B62M 9/10 474/160 |
| 6,866,604 B2 * | 3/2005 | Kamada | ................ | B60B 27/026 474/152 |
| 7,344,463 B2 * | 3/2008 | Reiter | ...................... | B62M 9/10 474/160 |
| 7,846,047 B2 * | 12/2010 | Nakano | .................... | B62M 9/10 474/152 |
| 7,871,347 B2 * | 1/2011 | Kamada | .................... | B62M 9/10 474/152 |
| 7,959,529 B2 * | 6/2011 | Braedt | ..................... | B62M 9/10 474/152 |
| 8,905,878 B2 * | 12/2014 | Loy | .......................... | B62M 9/10 474/160 |

(Continued)

FOREIGN PATENT DOCUMENTS

JP    S59-165293 U1    11/1984

*Primary Examiner* — Henry Y Liu
(74) *Attorney, Agent, or Firm* — Global IP Counselors, LLP

(57) ABSTRACT

A bicycle sprocket assembly is basically provided with a bicycle sprocket supporting member and at least one sprocket. The bicycle sprocket supporting member includes an outer peripheral surface and an inner peripheral surface. The outer peripheral surface includes at least one sprocket engaging spline. The inner peripheral surface includes at least one hub engaging spline. The at least one sprocket is configured to be axially movable on the outer peripheral surface of the sprocket supporting member before the bicycle sprocket assembly becomes an assembled state.

17 Claims, 9 Drawing Sheets

(56) References Cited

U.S. PATENT DOCUMENTS

| | | | |
|---|---|---|---|
| 9,415,835 B2* | 8/2016 | Tokuyama | B62M 9/12 |
| 9,511,819 B1* | 12/2016 | Watarai | F16H 55/30 |
| 9,533,735 B2* | 1/2017 | Braedt | B62M 9/10 |
| 9,550,547 B2* | 1/2017 | Valle | B62M 9/10 |
| 9,604,699 B2* | 3/2017 | Tsai | B62M 9/10 |
| 9,771,127 B2* | 9/2017 | Braedt | B62M 9/10 |
| 2004/0142782 A1* | 7/2004 | Kamada | B60B 27/026 474/160 |
| 2007/0129193 A1* | 6/2007 | Nonoshita | B62M 9/10 474/160 |
| 2008/0004143 A1* | 1/2008 | Kanehisa | B62M 9/10 474/160 |
| 2008/0202284 A1* | 8/2008 | Valle | B62M 3/00 74/594.1 |
| 2009/0042679 A1* | 2/2009 | Valle | B62M 9/10 474/152 |
| 2015/0210353 A1* | 7/2015 | Tokuyama | B62M 9/12 474/160 |

* cited by examiner

BICYCLE SPROCKET SUPPORTING MEMBER AND BICYCLE SPROCKET ASSEMBLY

BACKGROUND

Field of the Invention

This invention generally relates to a bicycle sprocket supporting member. More specifically, the present invention relates to a bicycle sprocket assembly including the bicycle sprocket supporting member.

Background Information

Most bicycles utilize a chain drive transmission in which a chain is moved between a plurality of front sprockets and a plurality of rear sprockets to change gears. In recent years, bicycle component manufacturers have been manufacturing bicycle transmissions that have more available speeds to the rider. As the available speeds in the bicycle transmission increases, the number of sprockets installed on the rear wheel also usually increases. Accordingly, various attempts have been made in order to increase the maximum number of sprockets that can be installed on a rear hub assembly. For example, some multiple sprocket assemblies use a spider (sprocket supporting member), which supports a plurality of ring-shaped sprocket wheels on a freewheel of a rear hub. In order to reduce an overall weight of the multiple sprocket assembly that uses a spider, a light metal, such as aluminum, etc., is generally used for the spider, while various types of steel materials are used for the sprockets to provide adequate strength. One example of a multiple sprocket assembly that uses a spider is disclosed in U.S. Pat. No. 6,382,381 (assigned to Shimano Inc.).

SUMMARY

Generally, the present disclosure is directed to various features of a bicycle sprocket supporting member and a bicycle sprocket assembly including the bicycle sprocket supporting member.

In view of the state of the known technology and in accordance with a first aspect of the present disclosure, a bicycle sprocket supporting member is basically provided that includes an outer peripheral surface and an inner peripheral surface. The outer peripheral surface includes at least one sprocket engaging spline. The inner peripheral surface includes at least one hub engaging spline. According to the first aspect of the present invention, the sprocket supporting member is effectively configured to provide easy attachment thereto.

In accordance with a second aspect of the present invention, a bicycle sprocket assembly includes the sprocket supporting member according to the first aspect and at least one sprocket configured to be axially movable on the outer peripheral surface of the sprocket supporting member before the bicycle sprocket assembly becomes an assembled state. According to the second aspect of the present invention, the at least one sprocket is axially movable on the outer surface of the sprocket supporting member to substantially prevent undue stress from being generated during assembly of the bicycle sprocket assembly.

In accordance with a third aspect of the present invention, the bicycle sprocket assembly according to the second aspect is configured so that a first sprocket carrier includes at least one first spline engaged with the at least one sprocket engaging spline of the sprocket supporting member. The first sprocket carrier supports the at least one sprocket. According to the third aspect of the present invention, the at least one sprocket carrier is effectively positioned to substantially prevent undue stress from being generated during assembly of the bicycle sprocket assembly.

In accordance with a fourth aspect of the present invention, the bicycle sprocket assembly according to the third aspect is configured so that the at least one sprocket includes a first sprocket and a second sprocket, and the first sprocket carrier supports the first sprocket and the second sprocket. According to the fourth aspect of the present invention, the first and second sprockets are effectively positioned to substantially prevent undue stress from being generated during assembly of the bicycle sprocket assembly.

In accordance with a fifth aspect of the present invention, the bicycle sprocket assembly according to the third or fourth aspect is configured to include at least one additional sprocket and a second sprocket carrier supporting the at least one additional sprocket. According to the fifth aspect of the present invention, the at least one additional sprocket and a second sprocket carrier are effectively positioned to substantially prevent undue stress from being generated during assembly of the bicycle sprocket assembly.

In accordance with a sixth aspect of the present invention, the bicycle sprocket assembly according to the fifth aspect is configured so that the at least one additional sprocket includes a third sprocket and a fourth sprocket. The second sprocket carrier supports the third sprocket and the fourth sprocket. According to the sixth aspect of the present invention, the third and fourth sprockets are effectively positioned to substantially prevent undue stress from being generated during assembly of the bicycle sprocket assembly.

In accordance with a seventh aspect of the present invention, the bicycle sprocket assembly according to the fifth or sixth aspect is configured so that the second sprocket carrier axially contacts one end of the sprocket supporting member. According to the seventh aspect of the present invention, the second sprocket carrier is effectively positioned to substantially prevent undue stress from being generated during assembly of the bicycle sprocket assembly.

In accordance with an eighth aspect of the present invention, the bicycle sprocket assembly according to any one of the fifth to seventh aspects is configured so that a fastening member connects the first sprocket carrier and the second sprocket carrier. According to the eighth aspect of the present invention, the fastening member is effectively positioned to substantially prevent undue stress from being generated during assembly of the bicycle sprocket assembly.

In accordance with a ninth aspect of the present invention, the bicycle sprocket assembly according to any one of the third to eighth aspects is configured so that the at least one sprocket engaging spline of the sprocket supporting member includes a first positioning spline and the at least one first spline of the first sprocket carrier includes a second positioning spline. The first positioning spline engages with the second positioning spline. The at least one hub engaging spline of the sprocket supporting member includes a third positioning spline. The third positioning spline is configured to engage with a fourth positioning spline of a bicycle hub assembly. According to the ninth aspect of the present invention, the first sprocket carrier, the sprocket supporting member and the bicycle hub assembly are effectively positioned to substantially prevent undue stress from being generated during assembly of the bicycle sprocket assembly.

In accordance with a tenth aspect of the present invention, the bicycle sprocket assembly according to the fourth aspect is configured to include at least one additional sprocket. A second sprocket carrier supports the at least one additional sprocket. According to the tenth aspect of the present invention, the at least one additional sprocket is effectively positioned to substantially prevent undue stress from being generated during assembly of the bicycle sprocket assembly.

In accordance with an eleventh aspect of the present invention, the bicycle sprocket assembly according to the tenth aspect is configured so that the at least one additional sprocket includes a third sprocket and a fourth sprocket. The second sprocket carrier supports the third sprocket and the fourth sprocket. According to the eleventh aspect of the present invention, the third and fourth sprockets are effectively positioned to substantially prevent undue stress from being generated during assembly of the bicycle sprocket assembly.

In accordance with a twelfth aspect of the present invention, the bicycle sprocket assembly according to the tenth or eleventh aspect is configured so that the second sprocket carrier axially contacts one end of the sprocket supporting member. According to the twelfth aspect of the present invention, the second sprocket carrier is effectively positioned to substantially prevent undue stress from being generated during assembly of the bicycle sprocket assembly.

In accordance with a thirteenth aspect of the present invention, the bicycle sprocket assembly according to any one of the tenth to twelfth aspects is configured so that at least one fastening member connects the first sprocket carrier and the second sprocket carrier. According to the thirteenth aspect of the present invention, the at least one fastener member connecting the first and second sprocket carriers is effectively positioned to substantially prevent undue stress from being generated during assembly of the bicycle sprocket assembly.

In accordance with a fourteenth aspect of the present invention, the bicycle sprocket assembly according to any one of the tenth to thirteenth aspects is configured so that the at least one sprocket engaging spline of the sprocket supporting member includes a first positioning spline and the at least one first spline of the first sprocket carrier includes a second positioning spline. The first positioning spline is engaged with the second positioning spline. The at least one hub engaging spline of the sprocket supporting member includes a third positioning spline. The third positioning spline is configured to engage with a fourth positioning spline of a bicycle hub assembly. According to the fourteenth aspect of the present invention, the sprocket supporting member, the first sprocket carrier and the bicycle hub assembly are effectively positioned to substantially prevent undue stress from being generated during assembly of the bicycle sprocket assembly.

In accordance with a fifteenth aspect of the present invention, the bicycle sprocket assembly according to the thirteenth or fourteenth aspect is configured so that the first sprocket includes a plurality of first sprocket teeth, the second sprocket includes a plurality of second sprocket teeth that is mater than a total number of the plurality of first sprocket teeth, the third sprocket includes a plurality of third sprocket teeth that is greater than a total number of the plurality of second sprocket teeth, and the fourth sprocket includes a plurality of fourth sprocket teeth that is greater than a total number of the plurality of third sprocket teeth. According to the fifteenth aspect of the present invention, the first to fourth sprockets are effectively positioned to substantially prevent undue stress from being generated during assembly of the bicycle sprocket assembly.

In accordance with a sixteenth aspect of the present invention, the bicycle sprocket assembly according to the fifteenth aspect is configured so that the at least one fastening member connects the first sprocket and the second sprocket to the first sprocket carrier. According to the sixteenth aspect of the present invention, the at least one fastener member connecting the first and second sprockets to the first sprocket carrier is effectively positioned to substantially prevent undue stress from being generated during assembly of the bicycle sprocket assembly.

In accordance with a seventeenth aspect of the present invention, the bicycle sprocket assembly according to the thirteenth or fourteenth aspect is configured so that the first sprocket includes a plurality of first sprocket teeth, the second sprocket includes a plurality of second sprocket teeth that is fewer than a total number of the plurality of first sprocket teeth, the third sprocket includes a plurality of third sprocket teeth that is fewer than a total number of the plurality of second sprocket teeth, and the fourth sprocket includes a plurality of fourth sprocket teeth that is fewer than a total number of the plurality of third sprocket teeth. According to the seventeenth aspect of the present invention, the first to fourth sprockets are effectively positioned to substantially prevent undue stress from being generated during assembly of the bicycle sprocket assembly.

In accordance with an eighteenth aspect of the present invention, the bicycle sprocket assembly according to the seventeenth aspect is configured so that the at least one fastening member connects the third sprocket and the fourth sprocket to the second sprocket carrier. According to the eighteenth aspect of the present invention, the at least one fastener member connecting the third and fourth sprockets to the second sprocket carrier is effectively positioned to substantially prevent undue stress from being generated during assembly of the bicycle sprocket assembly.

Also other objects, features, aspects and advantages of the disclosed bicycle sprocket assembly will become apparent to those skilled in the art from the following detailed description, which, taken in conjunction with the annexed drawings, discloses exemplary embodiments of the bicycle sprocket assembly and the bicycle sprocket supporting member.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the bicycle field from this disclosure that the following descriptions of the exemplary embodiments are provided for illustration only and not for the purpose of limiting the invention as defined by the appended claims and their equivalents.

Because the various parts of a bicycle are well known in the bicycle art, these parts of the bicycle will not be discussed or illustrated in detail herein, except as they are modified in accordance with the exemplary embodiments of the present invention. It will be apparent to those skilled in the bicycle field from this disclosure that a multiple bicycle sprocket assembly 1 in accordance with the present invention can have fewer or more sprockets.

Figure 1:
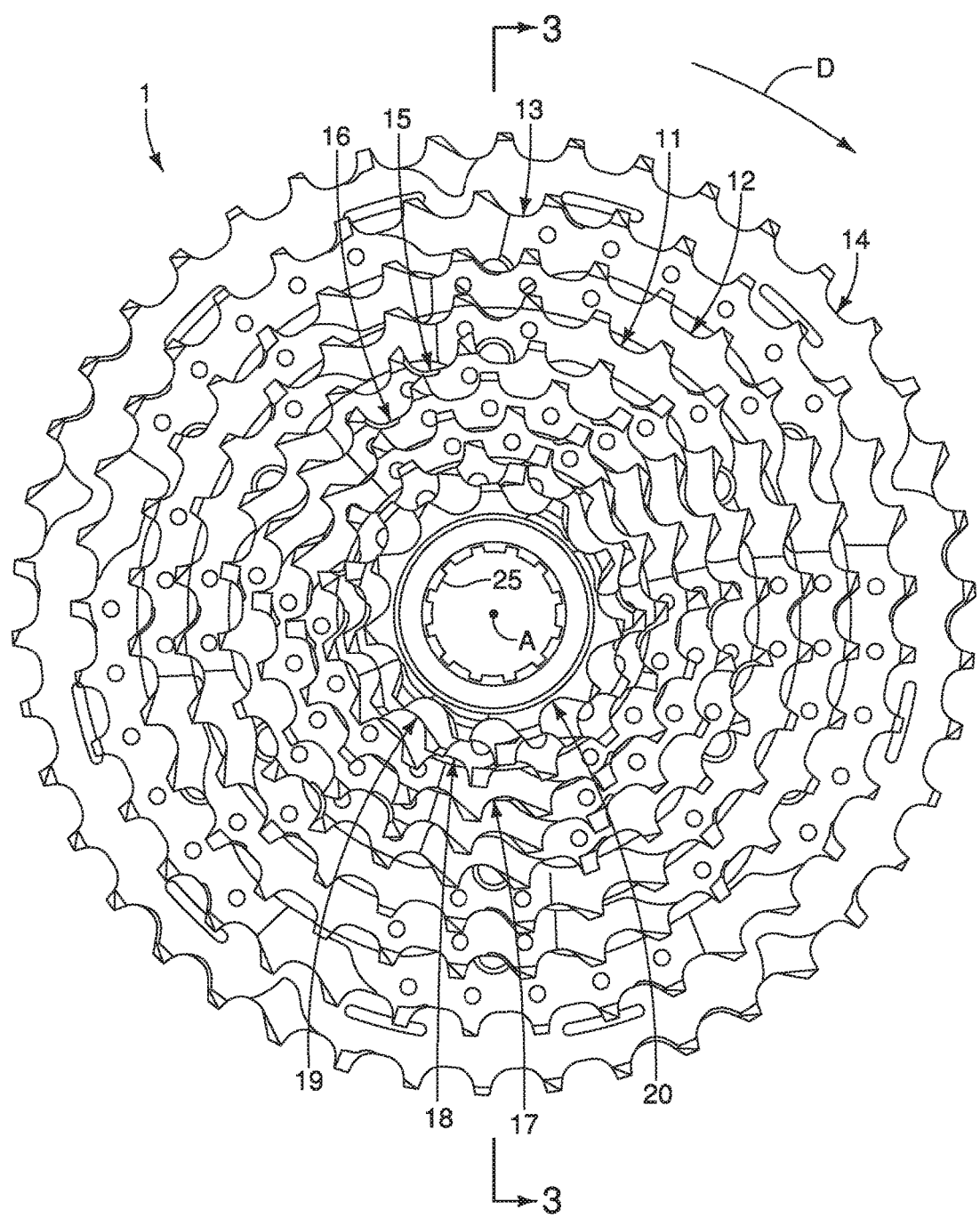
FIG. 1 is an outbound side elevational view of a multiple (ten-stage) bicycle sprocket assembly in accordance with one illustrated embodiment.
Figure 2:
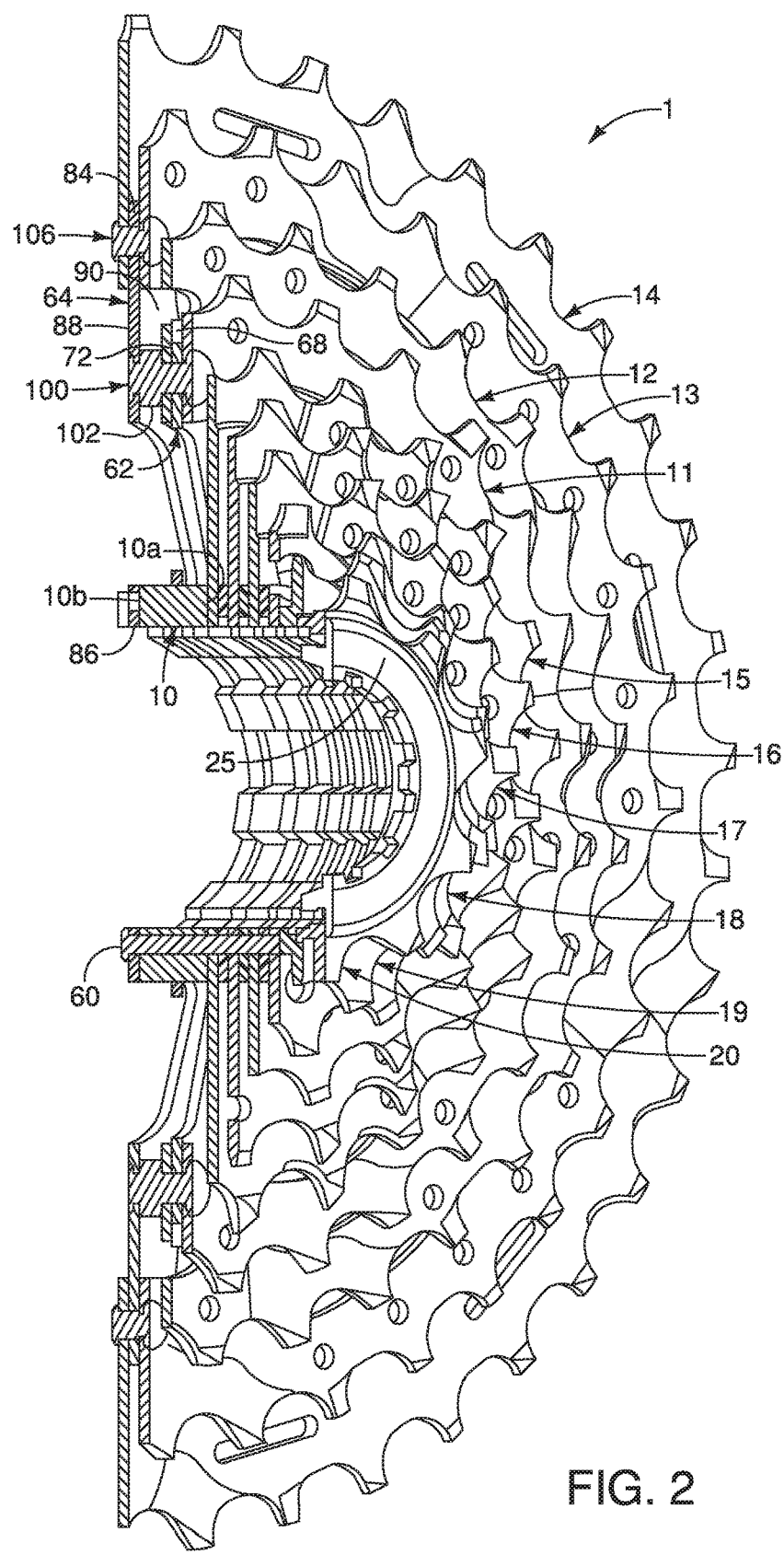
FIG. 2 is a perspective view of the multiple bicycle sprocket assembly of FIG. 1 with a portion broken away.
Figure 3:
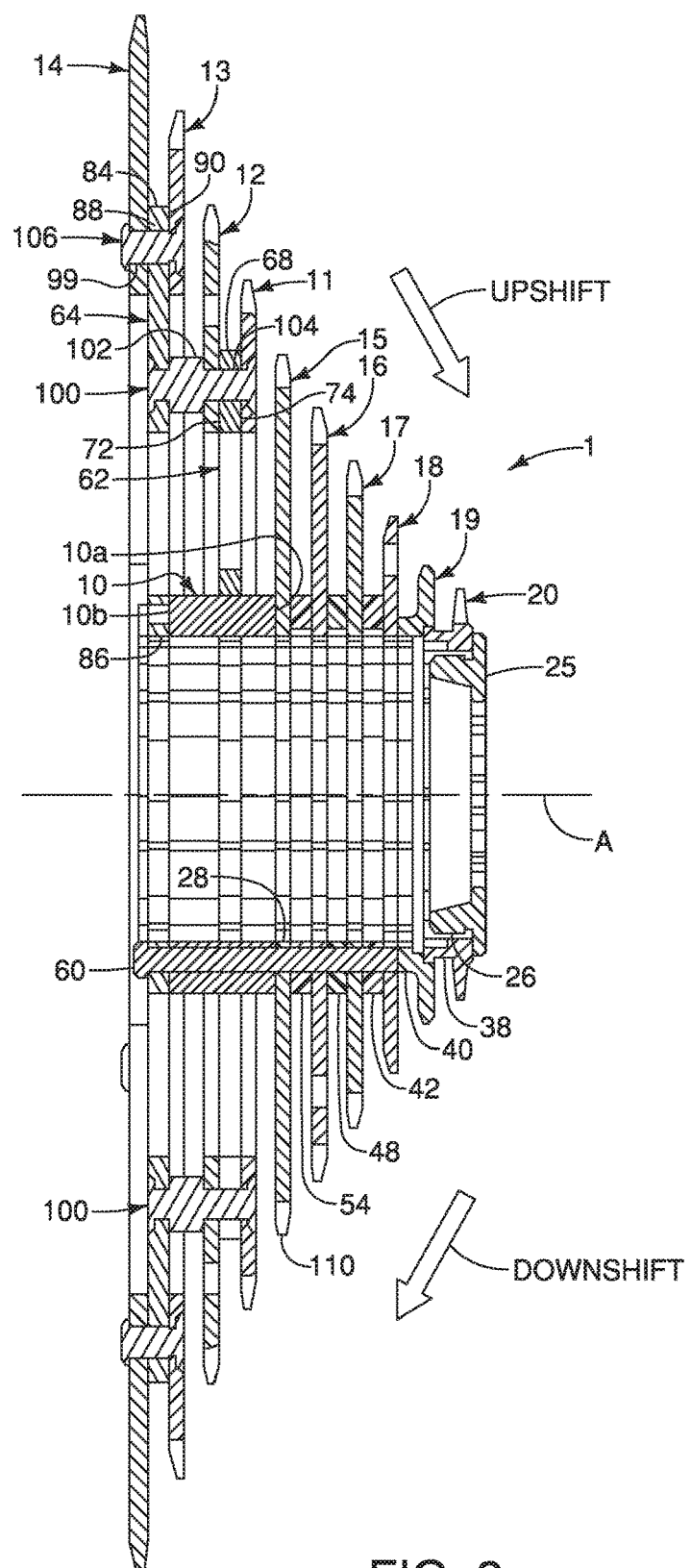
FIG. 3 is a cross sectional view of the multiple bicycle sprocket assembly as seen along section line 3-3 of FIG. 1.

Referring initially to FIGS. 1 to 3, a multiple bicycle sprocket assembly 1 is illustrated in accordance with a first exemplary embodiment of the present invention. In the illustrated exemplary embodiment, the multiple bicycle sprocket assembly 1 includes at least a sprocket supporting member 10 and at least one sprocket, such as a first sprocket 11. As shown in this exemplary embodiment, a second sprocket 12 is disposed adjacent the first sprocket 11. As shown in this exemplary embodiment, a third sprocket 13 is disposed adjacent the second sprocket 12 on an opposite side from the first sprocket 11, and a fourth sprocket 14 is disposed adjacent the third sprocket 13 on an opposite side from the second sprocket 12.

Figure 8:
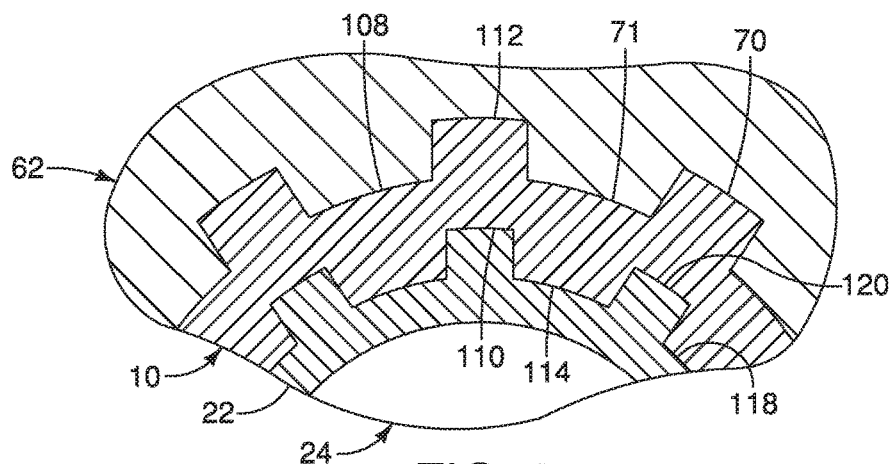
FIG. 8 is a partial cross section view of a sprocket supporting member illustrated in FIGS. 1 to 4 engaging with a sprocket carrier and a bicycle hub assembly.

As shown in FIGS. 1 to 3, the sprocket assembly 1 includes ten sprockets 11-20. The fifth through tenth sprockets 15-20 are disposed in a bicycle outbound direction of the first sprocket 11. The sprockets 11-20 are axially spaced from each other at predetermined intervals. The sprockets 15-20 are configured to be fixedly mounted on a freewheel 22 (FIG. 8) of a bicycle hub assembly 24 (FIG. 8). The sprockets 11-20 are configured to rotate together about a rotational center axis A. The sprockets 11-20 typically rotate together in a forward rotational direction D (e.g., in a clockwise direction as viewed in FIG. 1) when the rider is pedaling in a forward (clockwise) direction to propel the bicycle in a forward direction.

As shown in FIGS. 1 to 3, the sprockets 11 to 20 are hard, rigid disc shaped members formed from a suitable material, such as a metallic material. In the illustrated exemplary embodiment, the sprockets 11 to 20 are each a one-piece, unitary member formed of a metallic material that is suitable for a bicycle sprocket. Referring to FIG. 3, the sprocket assembly 1 is illustrated in partial cross-section with arrows showing the directions of an upshift operation and a downshift operation. An upshift operation occurs when the chain is moved from a large sprocket to the next smaller sprocket, while a downshift operation occurs when the chain is shifted from a small sprocket to the next larger sprocket. The sprockets 11 to 20 are designed so that the chain can execute smooth downshifting and upshifting motions. The sprockets 11-20 can include modified teeth, such as teeth having inclined surfaces, and/or recesses to facilitate the downshifting and upshifting operations.

As shown in FIGS. 1 to 3, the sprockets 11-20 are secured on the freewheel 22 (FIG. 8) of the bicycle huh assembly 24 (FIG. 8) with a lock ring 25. An outer peripheral surface 26 of the lock ring 25 is preferably threaded, as shown in FIG. 4, to engage with a threaded surface of the freewheel 22, thereby securing the sprocket assembly 1 to the bicycle hub assembly 24.

Figure 4:
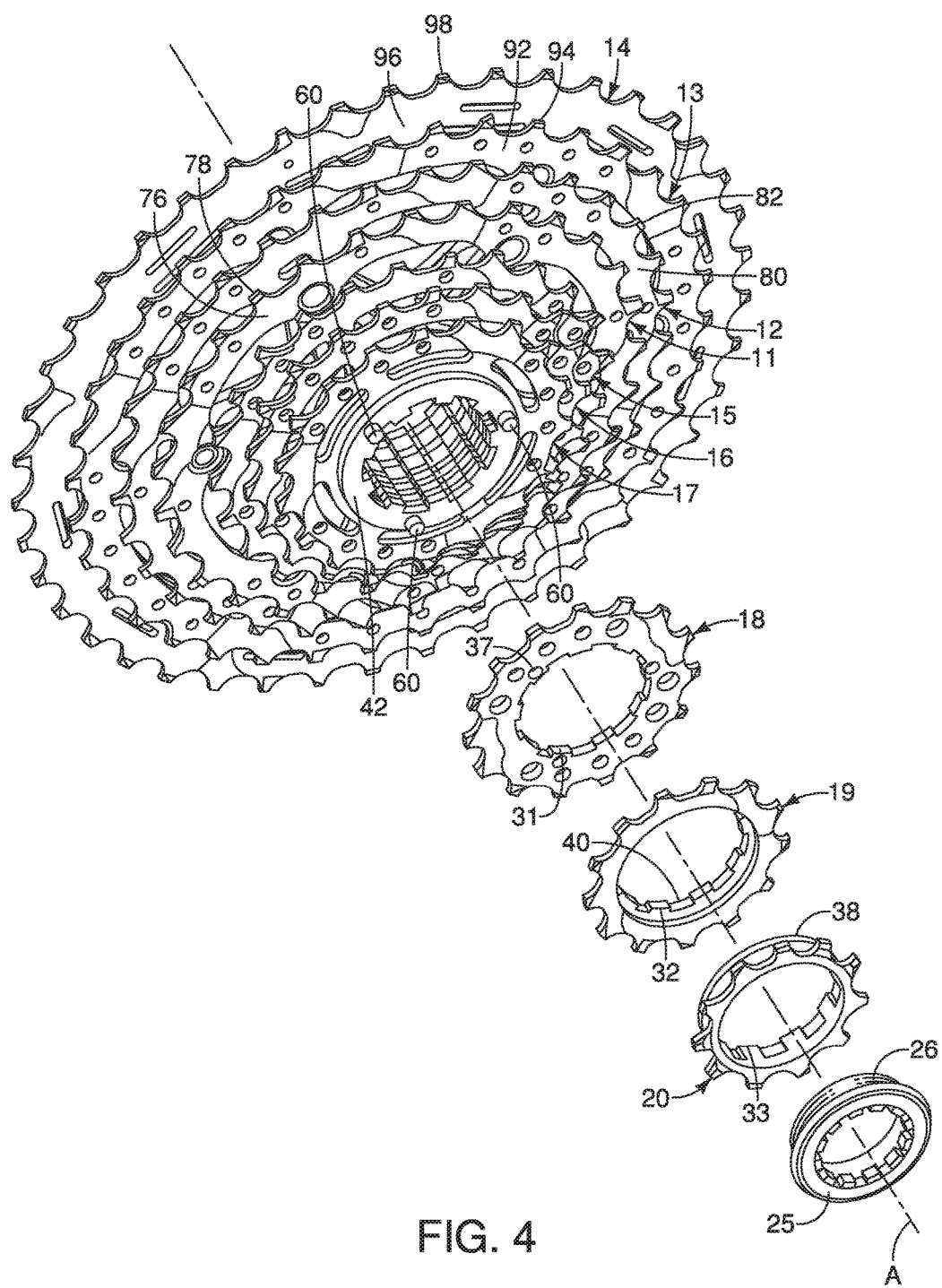
FIG. 4 is a partial exploded perspective view of the multiple bicycle sprocket assembly illustrated in FIGS. 1 to 3.
Figure 5:
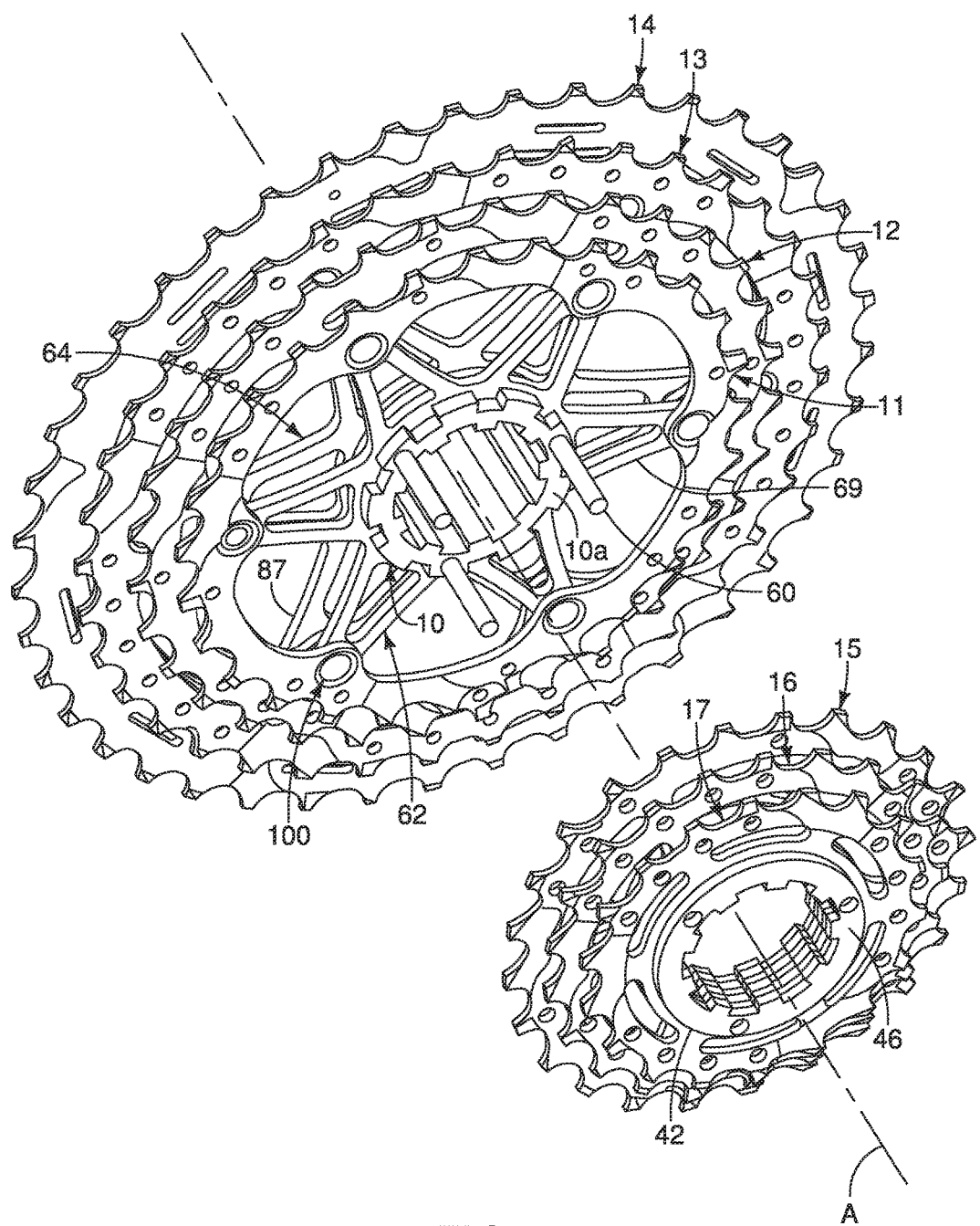
FIG. 5 is a partial exploded perspective view of selected sprockets of the multiple bicycle sprocket assembly illustrated in FIGS. 1 to 4.
Figure 6:
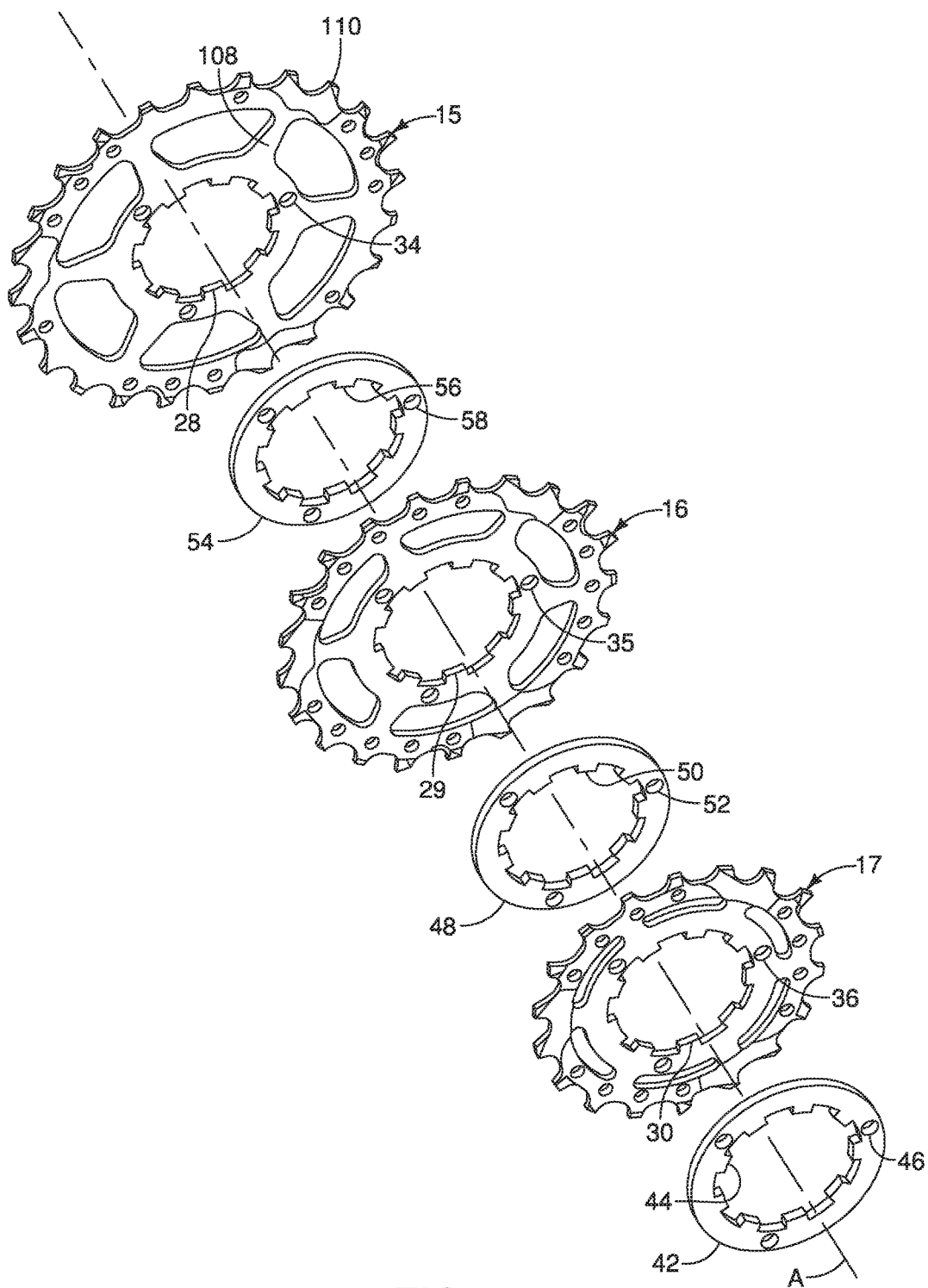
FIG. 6 is a partial exploded perspective view of selected sprockets of the multiple bicycle sprocket assembly illustrated in FIGS. 1 to 4.

Each of the sprockets 15 to 20 has a sprocket-hub engagement portion 28 to 33 configured to be directly fixedly mounted on the freewheel 22 of the bicycle hub assembly 24, as shown in FIGS. 4 to 6, thereby non-rotatably engaging each of the sprockets 15 to 20 with the freewheel 22. Each of the sprockets 15 to 18 has at least one fastener opening 34 to 37 disposed in a sprocket body thereof, as shown in FIGS. 4 and 6.

The sprocket 20 includes an integral axial spacing portion 38, as shown in FIGS. 3 and 4, to maintain axial space between the sprocket 20 and the sprocket 19. The sprocket 19 includes an integral axial spacing portion 40 to maintain axial space between the sprocket 19 and the sprocket 18.

A spacer 42, as shown in FIGS. 3, 4 and 6, is disposed on the freewheel 22 of the bicycle hub assembly 24. The spacer 42 is provided between the sprocket 18 and the sprocket 17 to maintain axial space between the sprockets 18 and 17. The spacer 42 includes a hub engagement portion 44 configured to be directly fixedly mounted on the freewheel 22, thereby non-rotatably engaging the spacer 42 with the freewheel 22 of the bicycle hub assembly 24. The spacer 42 includes at least one fastener opening 46.

A spacer 48, as shown in FIGS. 3 and 6, is disposed on the freewheel 22 of the bicycle hub assembly 24. The spacer 48 is provided between the sprocket 17 and the sprocket 16 to maintain axial space between the sprockets 17 and 16. The spacer 48 includes a hub engagement portion 50 configured to be directly fixedly mounted on the freewheel 22 of the bicycle hub assembly 24, thereby non-rotatably engaging the spacer 48 with the freewheel 22 of the bicycle hub assembly 24. The spacer 48 includes at least one fastener opening 52.

A spacer 54, as shown in FIGS. 3 and 6, is disposed on the freewheel 22 of the bicycle hub assembly 24. The spacer 54 is provided between the sprocket 16 and the sprocket 15 to maintain axial space between the sprockets 16 and 15. The spacer 54 includes a hub engagement portion 56 configured to be directly fixedly mounted on the freewheel 22 of the bicycle huh assembly 24, thereby non-rotatably engaging with the spacer 54 on the freewheel 22 of the bicycle hub assembly 24. The spacer 54 includes at least one fastener opening 58.

The sprockets 15 to 18 and the spacers 42, 48 and 54 are secured together by a fastener 60, as shown in FIGS. 2 to 4. The fastener 60 is received by the at least one fastener openings 34 to 37 in the sprockets 15 to 18 and by the at least one fastener openings 46, 52 and 58 in the spacers 42, 48 and 54. As shown in FIGS. 4 and 5, three fasteners 60 are used, although any suitable number of fasteners can be used.

A first sprocket carrier 62, a second sprocket carrier 64 and a bicycle sprocket supporting member 10 further receive the fastener 60 to form an integral unit, as shown in FIGS. 2 and 3. The first sprocket carrier 62 is directly fixedly mounted on the sprocket supporting member 10, as shown in FIGS. 2 and 3. The second sprocket carrier 64 is directly fixedly mounted on the freewheel 22 of the bicycle hub assembly 24. The first sprocket carrier 64 supports at least one sprocket. As shown in FIGS. 2 and 3, the at least one sprocket includes the first sprocket 11 and the second sprocket 12 such that the first sprocket carrier 62 supports the first and second sprockets 11 and 12 on the sprocket supporting member 10, which is supported on the freewheel 22 of the bicycle hub assembly 24. Accordingly, the first and second sprockets 11 and 12 are free from directly contacting the freewheel 22 of the bicycle hub assembly 24. The second sprocket carrier 64 supports the third and fourth sprockets 13 and 14 on the freewheel 22 of the bicycle hub assembly 24. Accordingly, the third and fourth sprockets 13 and 14 are free from directly contacting the freewheel 22 of the bicycle hub assembly 24.

Figure 7:
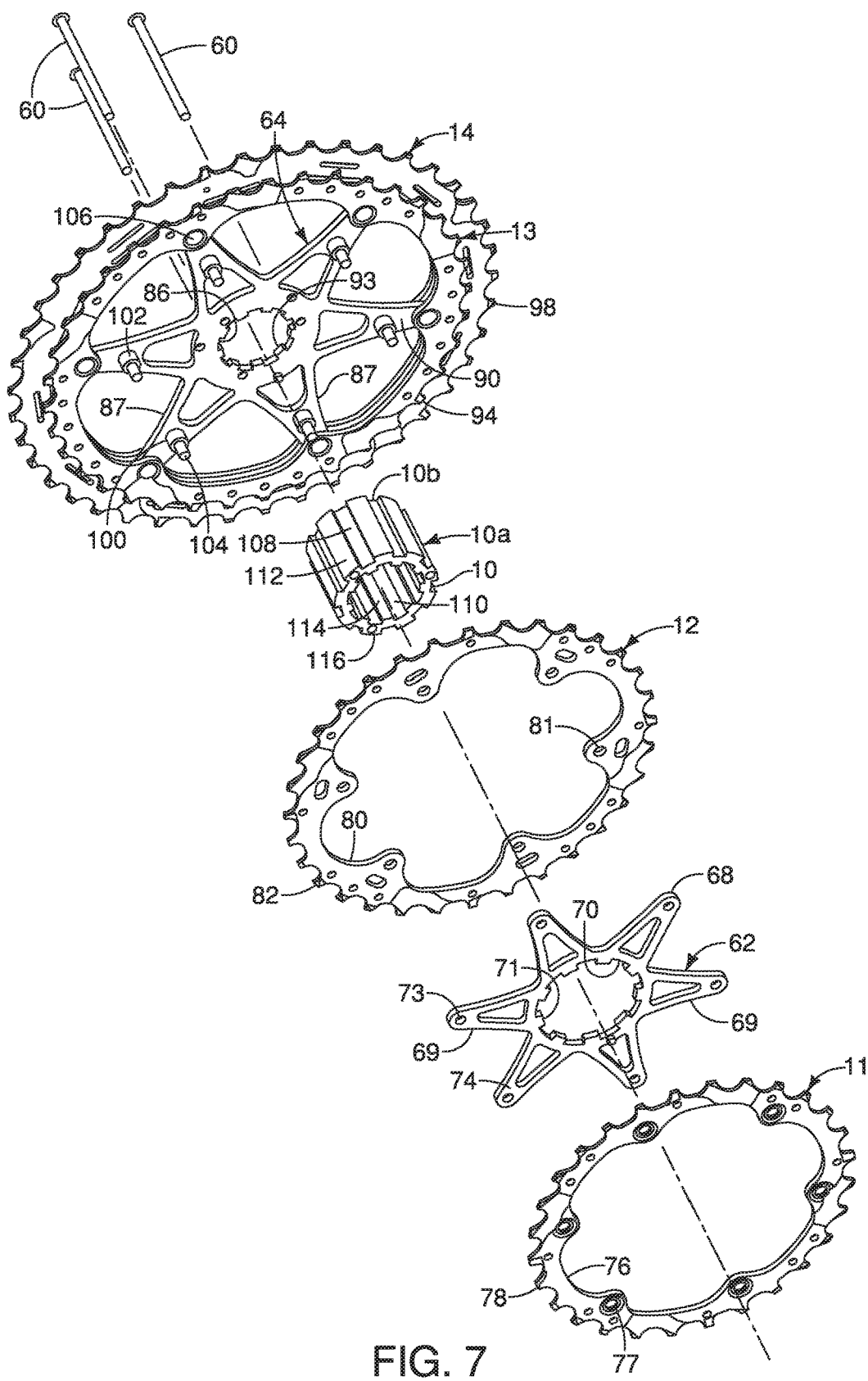
FIG. 7 is a partial exploded perspective view of selected sprockets of the multiple bicycle sprocket assembly illustrated in FIGS. 1 to 4.

The first sprocket carrier 62 includes a first sprocket mounting portion 68 and a sprocket supporting member engagement portion 70, as shown in FIGS. 3 and 7. The first sprocket mounting portion 68 includes a plurality of arms 69 radially extending from the sprocket supporting member engagement portion 70. As shown in FIG. 7, the first sprocket mounting portion 68 includes six arms 69, although any suitable number can be used. At least one fastener opening 73 is disposed in the first sprocket mounting portion 68. Preferably, a plurality of fastener openings 73 are spaced circumferentially from the rotational center axis A. The first sprocket mounting portion 68 has a first bicycle inbound facing side 72 and a first bicycle outbound facing side 74 opposite to the first bicycle inbound facing side 72 in an axial direction parallel to the rotational center axis A of the multiple bicycle sprocket assembly 1. The first sprocket 11 and the second sprocket 12 are coupled to the first sprocket mounting portion 68. At least one first spline 71 extends from the sprocket supporting member engagement portion 70. Preferably, a plurality of first splines 71 are circumferentially disposed about the sprocket supporting member engagement portion 70. The at least one first spline 71 of the sprocket supporting member engagement portion 70 non-rotatably engages with the sprocket supporting member 10, which engages with the freewheel 22 (FIG. 8) of the bicycle hub assembly 24 (FIG. 8) such that the first sprocket carrier 62 rotates together with the freewheel 22 of the bicycle hub assembly 24. The first sprocket carrier 62 is a separate member from the sprocket supporting member 10.

The first sprocket 11 includes a first sprocket body 76 and a plurality of first sprocket teeth 78 extending radially outwardly from the first sprocket body 76 with respect to the rotational center axis A, as shown in FIG. 7. The first sprocket 11 is a separate member from the first sprocket carrier 62. The first sprocket body 76 is coupled to one of the first bicycle inbound facing side 72 of the first sprocket mounting portion 68 and the bicycle outbound facing side 74 of the first sprocket mounting portion 68. At least one fastener opening 77 is disposed in the first sprocket body 76. Preferably, a plurality of fastener openings 77 are spaced circumferentially from the rotational center axis A. As shown in FIGS. 3 and 7, the first sprocket body 76 is coupled to the first bicycle outbound facing side 74 of the first sprocket mounting portion 68.

The second sprocket 12 includes a second sprocket body 80 and a plurality of second sprocket teeth 82 extending radially outwardly from the second sprocket body 80 with respect to the rotational center axis A, as shown in FIG. 7. The second sprocket 12 is a separate member from the first sprocket carrier 62. The second sprocket body 80 is coupled to the other of the first bicycle inbound facing side 72 of the first sprocket mounting portion 68 and the first bicycle outbound facing side 74 of the first sprocket mounting portion 68. At least one fastener opening 81 is disposed in the second sprocket body 80. Preferably, a plurality of fastener openings 81 are spaced circumferentially from the rotational center axis A. As shown in FIGS. 3 and 7, the second sprocket body 80 is coupled to the first bicycle inbound facing side 72 of the first sprocket mounting portion 68. A total number of the plurality of second sprocket teeth 82 is greater than a total number of the plurality of first sprocket teeth 78.

Figure 9:
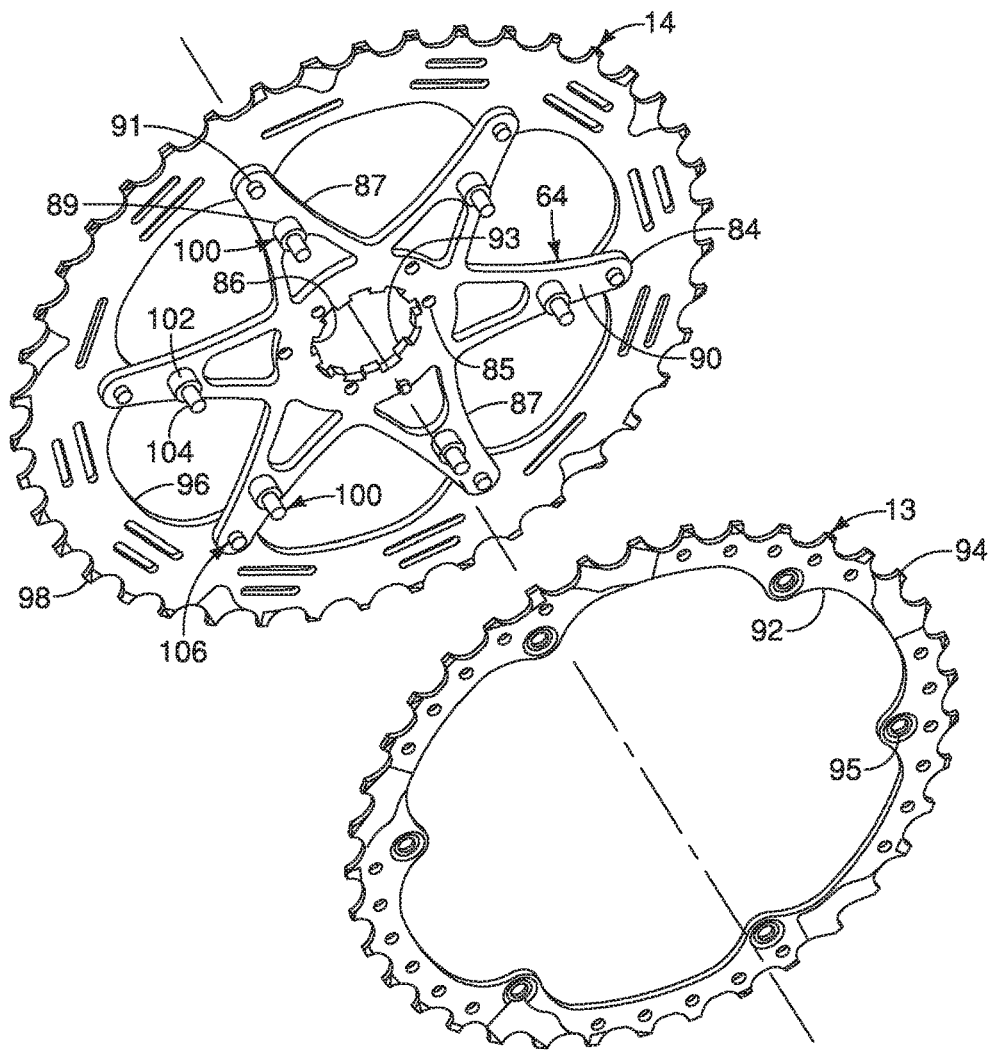
FIG. 9 is a partial exploded perspective view of selected sprockets of the multiple bicycle sprocket assembly illustrated in FIGS. 1 to 4.

The second sprocket carrier 64 includes a second sprocket mounting portion 84 and a hub engagement portion 86, as shown in FIGS. 3, 7 and 9. At least one fastener opening 85 is disposed in the hub engagement portion 86. Preferably, a plurality of fastener openings 85 are circumferentially spaced around the rotational center axis A. The second sprocket mounting portion 84 includes a plurality of arms 87 radially extending from the second hub engagement portion 86. As shown in FIG. 9, the second sprocket mounting portion 84 includes six arms 87, although any suitable number can be used. At least one inner fastener opening 89 is disposed in the second sprocket mounting portion 84. Preferably, a plurality of inner fastener openings 89 are spaced circumferentially around the rotational center axis A. At least one outer fastener opening 91 is disposed in the second sprocket mounting portion 84 radially outward from the at least one inner fastener opening 89 with respect to the rotational center axis A. Preferably, a plurality of outer fastener openings 91 are spaced circumferentially around the rotational center axis A. As shown in FIGS. 7 and 9, the first and second sprocket carriers 62 and 64 have substantially similar shapes, except that the second sprocket carrier 64 extends further radially from the rotational center axis A than the first sprocket carrier 62. The second sprocket mounting portion 84 has a second bicycle inbound facing side 88 and a second bicycle outbound facing side 90 opposite to the second bicycle inbound facing side 88 in the axial direction, which is parallel to the rotational center axis A of the multiple bicycle sprocket assembly 1.

The second sprocket carrier 64 supports at least one additional sprocket. As shown in FIGS. 2 and 3, the at least one additional sprocket includes the third sprocket 13 and the fourth sprocket 14 such that the second sprocket carrier 64 supports the third and fourth sprockets 13 and 14, which are fixed to the second sprocket mounting portion 84. At least one spline 93 extends from the hub engagement portion 86. Preferably, a plurality of splines 93 are circumferentially disposed about the hub engagement portion 86. The at least one spline 93 of the hub engagement portion 86 non-rotatably engages the freewheel 22 (FIG. 8) of the bicycle hub assembly 24 (FIG. 8) such that the second sprocket carrier 64 rotates together with the freewheel 22 of the bicycle hub assembly 24.

The third sprocket 13 includes a third sprocket body 92 and a plurality of third sprocket teeth 94 extending radially outwardly from the third sprocket body 92 with respect to the rotational center axis A, as shown in FIG. 9. The third sprocket 13 is a separate member from the second sprocket carrier 64. At least one fastener opening 95 is disposed in the third sprocket body 92. Preferably, a plurality of fastener openings 95 are circumferentially spaced around the rotational center axis A. The third sprocket body 92 is coupled to one of the second bicycle inbound facing side 88 of the second sprocket mounting portion 84 and the second bicycle outbound facing side 90 of the second sprocket mounting portion 84. As shown in FIGS. 3 and 9, the third sprocket body 92 is coupled to the second bicycle outbound facing side 90 of the second sprocket mounting portion 84. A total number of the linen plurality of third sprocket teeth 94 is greater than a total number of the plurality of second sprocket teeth 82.

The fourth sprocket 14 includes a fourth sprocket body 96 and a plurality of fourth sprocket teeth 98 extending radially outwardly from the fourth sprocket body 96 with respect to the rotational center axis A, as shown in FIGS. 3 and 9. The fourth sprocket 14 is a separate member from the second sprocket carrier 64. At least one fastener opening 99 (FIG. 3) is disposed in the fourth sprocket body 96. Preferably, a plurality of fastener openings 99 are circumferentially spaced around the rotational center axis A. The fourth sprocket body 96 is coupled to the other of the second bicycle inbound facing side 88 of the second sprocket mounting portion 84 and the second bicycle outbound facing side 90 of the second sprocket mounting portion 84. As shown in FIGS. 3 and 9, the fourth sprocket body 96 is coupled to the second bicycle inbound facing side 88 of the second sprocket mounting portion 84. A total number of the plurality of fourth sprocket teeth 98 is greater than a total number of the plurality of third sprocket teeth 94.

At least one fastening member 100 connects the first sprocket carrier 62 and the second sprocket carrier 64, as shown in FIGS. 3, 7 and 8. The at least one fastening member 100 is a separate member from the first sprocket carrier 62 and the second sprocket carrier 64. The fastening member 100 passes through the fastener openings 89, 81, 73 and 77 in the second sprocket carrier 64, the second sprocket 12, the first sprocket carrier 62 and the first sprocket 11. The fastening member 100 can be made from any suitable material, such as the fastening member being made of a metallic material. The fastening member 100 can be any suitable fastener, such as a rivet. As shown in FIGS. 7 and 9, a plurality of fastening members 100 are spaced circumferentially about the rotational center axis A. Although six fastening members 100 are illustrated, any suitable number of fastening members can be used. Pedaling torque is transmitted through both the at least one fastening member 100 to the first sprocket carrier 62 and through the hub engagement portion 86 of the second sprocket carrier 64, thereby allowing an axial thickness of the first and second sprocket carriers 62 and 64 to be reduced.

The at least one fastening member 100 is disposed radially outwardly from the sprocket supporting member engagement portion 70 and the hub engagement portion 86 of the first and second sprocket carriers 62 and 64, respectively, as shown in FIGS. 3 and 7. The at least one fastening member 100 is spaced apart from the sprocket supporting member engagement portion 70 and the hub engagement portion 86 of the first and second sprocket carriers 62 and 64.

As shown in FIGS. 2, 3, 7 and 8, the fastening member 100 has a space maintaining portion 102 to maintain an axial space between the second sprocket carrier 64 and the second sprocket 12, thereby providing the appropriate axial spacing between the sprockets coupled to the first and second sprocket carriers 62 and 64. Preferably, the space maintaining portion 102 is an integral part of the fastening member 100. The fastening member 100, as shown in FIGS. 3, 7 and 8, includes a shaft portion 104. The shaft portion 104 can be integrally formed with the space maintaining portion 102 as a single member. Alternatively, the space maintaining portion 102 is a separate member from the shaft portion 104 and is mounted on the shaft portion 104. When the space maintaining portion 102 is a separate member from the shaft portion 104, the space maintaining portion 102 is secured to the shaft portion 104 in any suitable manner.

As shown in FIGS. 2, 3, 7 and 9, the first sprocket 11 and the second sprocket 12 are coupled to the first sprocket mounting portion 68 of the first sprocket carrier 62 by the at least one fastening member 100, thereby rigidly coupling the first and second sprockets 11 and 12 to the first sprocket carrier 62. The at least one fastening member 100 connects the first sprocket 11 and the second sprocket 12 to the first sprocket carrier 62 such that the first and second sprockets 11 and 12 rotate together with the first sprocket carrier 62.

As shown in FIGS. 3, 7 and 9, the third sprocket 13 and the fourth sprocket 14 are coupled to the second sprocket mounting portion 84 of the second sprocket carrier 64 by at least one fastener 106, thereby rigidly coupling the third and fourth sprockets 13 and 14 to the second sprocket carrier 64. Fastener openings 95, 91 and 99 receive the at least one fastener 106. The at least one fastener 106 connects the third and fourth sprockets 13 and 14 to the second sprocket carrier 64 such that the third and fourth sprockets 13 and 14 rotate together with the second sprocket carrier 64. The at least one fastening member 100 is disposed radially inwardly from the at least one fastener 106 to facilitate transmission of pedaling torque from the second sprocket carrier 64 to the first sprocket carrier 62. A plurality of fasteners 106 are spaced circumferentially about the rotational center axis A. Although six fasteners 106 are illustrated, any suitable number of fasteners can be used.

The bicycle sprocket supporting member 10 supports the first sprocket carrier 62, as shown in FIGS. 2, 3, 5, 7 and 8. The bicycle sprocket supporting member 10 has an outer peripheral surface 108 and an inner peripheral surface 110. At least one sprocket engaging spline 112 extends radially from the outer peripheral surface 108 in a direction away from the inner peripheral surface 110. At least one hub engaging spline 114 extends radially from the inner peripheral surface 110 in a direction away from the outer peripheral surface 108.

The sprocket supporting member 10 has a first end 10a and a second end 10b, as shown in FIGS. 3, 5 and 7. The at least one sprocket engaging spline 112 preferably extends from the first end 10a to the second end 10b on the outer peripheral surface 108. The at least one hub engaging spline 114 preferably extends from the first end 10a to the second end 10b on the inner peripheral surface 110.

As shown in FIG. 3, the first end 10a of the sprocket supporting member 10 axially contacts the fifth sprocket 15. The second end 10b of the sprocket supporting member 10 axially contacts the second sprocket carrier 64. The sprocket supporting member 10 maintains axial spacing between the second sprocket carrier 64 and the fifth sprocket 15. The sprocket supporting member 10 is positioned on an axial outbound side of the second sprocket carrier 64.

As shown in FIG. 8, the freewheel 22 of the bicycle hub assembly 24 has an outer peripheral surface 118 from which at least one fourth positioning spline 120 extends outwardly. The at least one fourth positioning spline 120 of the freewheel 22 of the bicycle hub assembly 24 is configured to engage with the at least one hub engaging spline 114 of the sprocket supporting member 10, such that the sprocket supporting member 10 rotates together with the freewheel 22 of the bicycle hub assembly 24. The first splines 71 of the first sprocket carrier 62 engage with the sprocket engaging splines 112 of the sprocket supporting member 10, such that the first sprocket carrier 62 rotates together with the sprocket supporting member 10. Rotation of the first and second sprockets 11 and 12 rotates the freewheel 22 of the bicycle hub assembly 24 through the splined connections between the first sprocket carrier 62, the sprocket supporting member 10 and the freewheel 22 of the bicycle hub assembly 24.

The sprockets 15 to 18, the spacers 42, 48 and 54, the bicycle sprocket supporting member 10 and the second sprocket carrier 64 are secured together by a fastener 60, as shown in FIGS. 2 to 5. The fastener 60 is received by the at least one fastener openings 34, 35, 36 and 37 in the sprockets 15 to 18, by the at least one fastener openings 46, 52 and 58 in the spacers 42, 48 and 54 and by at least one fastener opening 116 of the sprocket supporting member 10. As shown in FIG. 4, three fasteners 60 are used, although any suitable number of fasteners can be used.

The sprocket supporting member 10 and the second sprocket carrier 64 further receive the fastener 60 to form an integral unit, as shown in FIGS. 2 and 3. The sprocket supporting member 10 and the second sprocket carrier 64 are directly fixedly mounted on the freewheel 22 of the bicycle hub assembly 24. The sprocket supporting member 10 supports the first sprocket carrier 62, which supports the first and second sprockets 11 and 12. The second sprocket carrier 64 supports the third and fourth sprockets 13 and 14 on the freewheel 22 of the bicycle hub assembly 24. Accordingly, the first to fourth sprockets 11-14 are free from directly contacting the freewheel 22 of the bicycle hub assembly 24.

The first sprocket carrier 62 is configured to be axially movable on the outer peripheral surface 108 of the sprocket supporting member 10 before the bicycle sprocket assembly 1 becomes an assembled state. Accordingly, at least one sprocket, such as the first sprocket 11 or the second sprocket 12, is configured to be axially movable on the outer peripheral surface 108 of the sprocket supporting member 10 before the bicycle sprocket assembly 1 becomes an assembled state. The at least one first spline 71 of the first sprocket carrier 62 engages with the at least one sprocket engaging spline 112 of the sprocket supporting member 10, as shown in FIG. 8, to allow the first sprocket carrier 62 to axially move on the sprocket supporting member 10 prior to being fixed to the second sprocket carrier 64 to ensure dimensional accuracy therebetween and to substantially prevent undue stress from being generated, such as by deflection of the at least one sprocket during assembly. The at least one sprocket engaging spline 112 of the sprocket supporting member 10 includes a first positioning spline and the at least one first spline 71 of the first sprocket carrier 62 includes a second positioning spline such that the first positioning spline is engaged with the second positioning spline. The at least one hub engaging spline 114 of the sprocket supporting member 10 includes a third positioning spline that is configured to engage with the fourth positioning, spline 120 of the bicycle hub assembly 24. Accordingly, when the fastener 100 connects, such as by swaging, the first and second sprocket carriers 62 and 64 and the first and second sprockets 11 and 12, the first sprocket carrier 62, including the first and second sprockets 11 and 12, being configured to axially move on the sprocket supporting member 10 prevents undue stress from being generated in the first sprocket carrier 62. The axial movement of the first sprocket carrier 62 prevents undue stress from being generated before the bicycle sprocket assembly 1 becomes an assembled state. The assembled state of the bicycle sprocket assembly 1 is defined as when the first sprocket carrier 62 is fixed to the second sprocket carrier 64 by the fastener 100.

Figure 10:
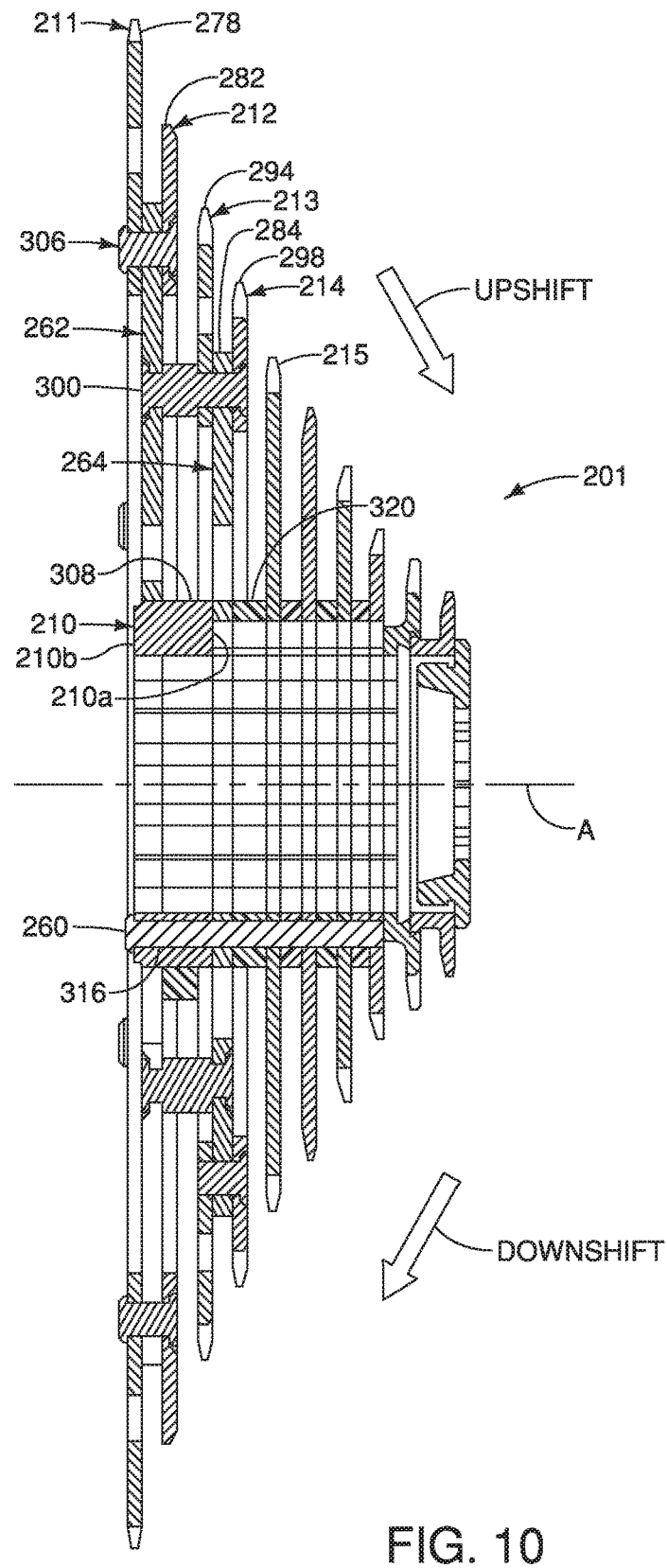
FIG. 10 is a cross sectional view, similar to FIG. 3, of an alternative multiple (ten-stage) bicycle sprocket assembly in accordance with another illustrated embodiment.

As shown in FIG. 10, a multiple bicycle sprocket assembly 201 in accordance with a second exemplary embodiment of the present invention is substantially similar to the multiple bicycle sprocket assembly 1 of the first exemplary embodiment except for the differences described below. Similar parts are identified with similar reference numerals, except increased by 200 (i.e., 2xx or 3xx, accordingly).

The at least one fastening member 300 connects the third sprocket 213 and the fourth sprocket 214 to the second sprocket carrier 264. The first sprocket carrier 262 and the second sprocket carrier 264 are further coupled by the at least one fastening member 300. At least one fastener 306 couples the first sprocket 211 and the second sprocket 212 to the first sprocket carrier 262. The at least one fastening member 300 is disposed radially inwardly from the at least one fastener 306. Pedaling torque is transmitted through the at least one fastening member 300 to both the first and second sprocket carriers 262 and 264, thereby allowing an axial thickness of the first and second sprocket carrier 262 and 264 to be reduced.

The sprocket supporting member 210 is configured substantially similarly as the sprocket supporting member 10 of the first exemplary embodiment. The sprocket supporting member 210 has a first end 210a and a second end 210b. The first end 210a of the sprocket supporting member 210 axially contacts a bicycle inbound end of the freewheel of the bicycle hub assembly 24. The second end 210b of the sprocket supporting member 210 axially contacts the second sprocket carrier 264. The sprocket supporting member 210 maintains axial spacing between the second sprocket carrier 264 and the bicycle inbound end of the freewheel of the bicycle hub assembly 24. The sprocket supporting member 210 is positioned on an axial inbound side of the second sprocket carrier 264.

The first sprocket 211 includes a plurality of first sprocket teeth 278. The second sprocket 212 includes a plurality of second sprocket teeth 282 that is fewer than a total number of the plurality of first sprocket teeth 278. The third sprocket 213 includes a plurality of third sprocket teeth 294 that is fewer than a total number of the plurality of second sprocket teeth 282. The fourth sprocket 214 includes a plurality of fourth sprocket teeth 298 that is fewer than a total number of the plurality of third sprocket teeth 294.

The first sprocket carrier 262 is configured to be axially movable on an outer peripheral surface 308 of the sprocket supporting member 210 before the bicycle sprocket assembly 201 becomes an assembled state in a similar manner as the first sprocket carrier 62 of the first exemplary embodiment. Accordingly, when the fastener 300 connects, such as by swaging, the first and second sprocket carriers 262 and 264 and the third and fourth sprockets 213 and 214, the first sprocket carrier 262 being configured to axially move on the sprocket supporting member 210 prevents undue stress from being generated in the first sprocket carrier 262. The axial movement of the first sprocket carrier 262 prevents undue stress from being generated before the bicycle sprocket assembly 201 becomes an assembled state. The assembled state of the bicycle sprocket assembly 201 is defined as when the first sprocket carrier 262 is fixed to the second sprocket carrier member 264 by the fastener 300.

Although shown in FIGS. 1 to 10 as a rear sprocket assembly, the bicycle sprocket assembly in accordance with the exemplary embodiments of the present invention is equally applicable to a front sprocket assembly.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the multiple bicycle sprocket assembly. Accordingly, these directional terms, as utilized to describe the multiple bicycle sprocket assembly should be interpreted relative to a bicycle in an upright riding position on a horizontal surface and that is equipped with the multiple bicycle sprocket assembly. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle sprocket assembly comprising:
   a bicycle sprocket supporting member including
      an outer peripheral surface including at least one sprocket engaging spline; and
      an inner peripheral surface including at least one hub engaging spline; and
   at least one sprocket configured to be axially movable on the outer peripheral surface of the sprocket supporting member before the bicycle sprocket assembly becomes an assembled state.

2. The bicycle sprocket assembly according to claim 1, further comprising
   a first sprocket carrier including at least one first spline engaged with at least one sprocket engaging spline of the sprocket supporting member, the first sprocket carrier supporting the at least one sprocket.

3. The bicycle sprocket assembly according to claim 2, wherein
   the least one sprocket includes a first sprocket and a second sprocket, and
   the first sprocket carrier supports the first sprocket and the second sprocket.

4. The bicycle sprocket assembly according to claim 2, further comprising
   at least one additional sprocket; and
   a second sprocket carrier supporting the at least one additional sprocket.

5. The bicycle sprocket assembly according to claim 4, wherein
   the at least one additional sprocket includes a third sprocket and a fourth sprocket, and
   the second sprocket carrier supports the third sprocket and the fourth sprocket.

6. The bicycle sprocket assembly according to claim 4, wherein
   the second sprocket carrier axially contacts one end of the sprocket supporting member.

7. The bicycle sprocket assembly according to claim 4, further comprising
   a fastening member connecting the first sprocket carrier and the second sprocket carrier.

8. The bicycle sprocket assembly according to claim 2, wherein
   the at least one sprocket engaging spline of the sprocket supporting member includes a first positioning spline, the at least one first spline of the first sprocket carrier includes a second positioning spline, the first positioning spline being engaged with the second positioning spline, and
   the at least one hub engaging spline of the sprocket supporting member includes a third positioning spline, the third positioning spline configured to engage with a fourth positioning spline of a bicycle hub assembly.

9. The bicycle sprocket assembly according to claim 3, further comprising
   at least one additional sprocket; and
   a second sprocket carrier supporting the at least one additional sprocket.

10. The bicycle sprocket assembly according to claim 9, wherein
    the at least one additional sprocket includes a third sprocket and a fourth sprocket, and the second sprocket carrier supports the third sprocket and the fourth sprocket.

11. The bicycle sprocket assembly according to claim 10, wherein
the second sprocket carrier axially contacts one end of the sprocket supporting member.

12. The bicycle sprocket assembly according to claim 11, further comprising
at least one fastening member connecting the first sprocket carrier and the second sprocket carrier.

13. The bicycle sprocket assembly according to claim 12, wherein
the at least one sprocket engaging spline of the sprocket supporting member includes a first positioning spline, the at least one first spline of the first sprocket carrier includes a second positioning spline, the first positioning spline being engaged with the second positioning spline, and
the at least one hub engaging spline of the sprocket supporting member includes a third positioning spline, the third positioning spline configured to engage with a fourth positioning spline of a bicycle hub assembly.

14. The sprocket assembly according to claim 12, wherein
the first sprocket including a plurality of first sprocket teeth,
the second sprocket including a plurality of second sprocket teeth that is greater than a total number of the plurality of first sprocket teeth,
the third sprocket including a plurality of third sprocket teeth that is greater than a total number of the plurality of second sprocket teeth, and
the fourth sprocket including a plurality of fourth sprocket teeth that is greater than a total number of the plurality of third sprocket teeth.

15. The bicycle sprocket assembly according to claim 14, wherein
the at least one fastening member connects the first sprocket and the second sprocket to the first sprocket carrier.

16. The sprocket assembly according to claim 12, wherein
the first sprocket including a plurality of first sprocket teeth,
the second sprocket including a plurality of second sprocket teeth that is fewer than a total number of the plurality of first sprocket teeth,
the third sprocket including a plurality of third sprocket teeth that is fewer than a total number of the plurality of second sprocket teeth, and
the fourth sprocket including a plurality of fourth sprocket teeth that is fewer than a total number of the plurality of third sprocket teeth.

17. The bicycle sprocket assembly according to claim 16, wherein
the at least one fastening member connects the third sprocket and the fourth sprocket to the second sprocket carrier.

* * * * *